US012638979B2

(12) United States Patent
Li

(10) Patent No.: US 12,638,979 B2
(45) Date of Patent: May 26, 2026

(54) FLASH MEMORY CONTROLLER AND DATA READING METHOD OF FLASH MEMORY CONTROLLER CAPABLE OF ENHANCING AND MAXIMIZING PERFORMANCE OF READ OPERATIONS

(71) Applicant: Silicon Motion, Inc., Hsinchu County (TW)

(72) Inventor: Fahao Li, Shenzhen City (CN)

(73) Assignee: Silicon Motion, Inc., Hsinchu County (TW)

(*) Notice: Subject to any disclaimer, the term of this patent is extended or adjusted under 35 U.S.C. 154(b) by 0 days.

(21) Appl. No.: 19/008,583

(22) Filed: Jan. 2, 2025

(65) Prior Publication Data

US 2026/0126914 A1 May 7, 2026

(30) Foreign Application Priority Data

Nov. 4, 2024 (CN) .......................... 202411561868.9

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| | | | |
|---|---|---|---|
| 11,243,713 B2* | 2/2022 | Park | G06F 3/0613 |
| 2016/0259671 A1 | 9/2016 | Gosalia | |
| 2019/0087126 A1* | 3/2019 | Chun | G06F 3/0611 |
| 2021/0165607 A1* | 6/2021 | Ji | G06F 3/0653 |
| 2021/0382656 A1* | 12/2021 | Rho | G06F 3/0656 |
| 2022/0197560 A1* | 6/2022 | Na | G06F 3/0652 |
| 2024/0143182 A1* | 5/2024 | Lee | G06F 3/0659 |
| 2025/0284403 A1* | 9/2025 | Xu | G06F 3/0679 |

FOREIGN PATENT DOCUMENTS

| | | |
|---|---|---|
| CN | 104298610 A | 1/2015 |
| TW | 201820147 A | 6/2018 |
| TW | 202246974 A | 12/2022 |

* cited by examiner

*Primary Examiner* — Sean D Rossiter
(74) *Attorney, Agent, or Firm* — Winston Hsu

(57) ABSTRACT

A flash memory controller includes a controller circuit and a scheduler circuit. The controller circuit receives a multi-plane read command signal sent from a host device to respectively read data of storage pages, corresponding to the carried address information, on multiple memory planes within a flash memory. The controller circuit stores the first read commands in the first pending list and stores the second read commands in the second pending list. The scheduler circuit reorders the read commands stored in the first and second pending lists to make first data output time intervals be staggered and not overlap with second data output time intervals.

20 Claims, 5 Drawing Sheets

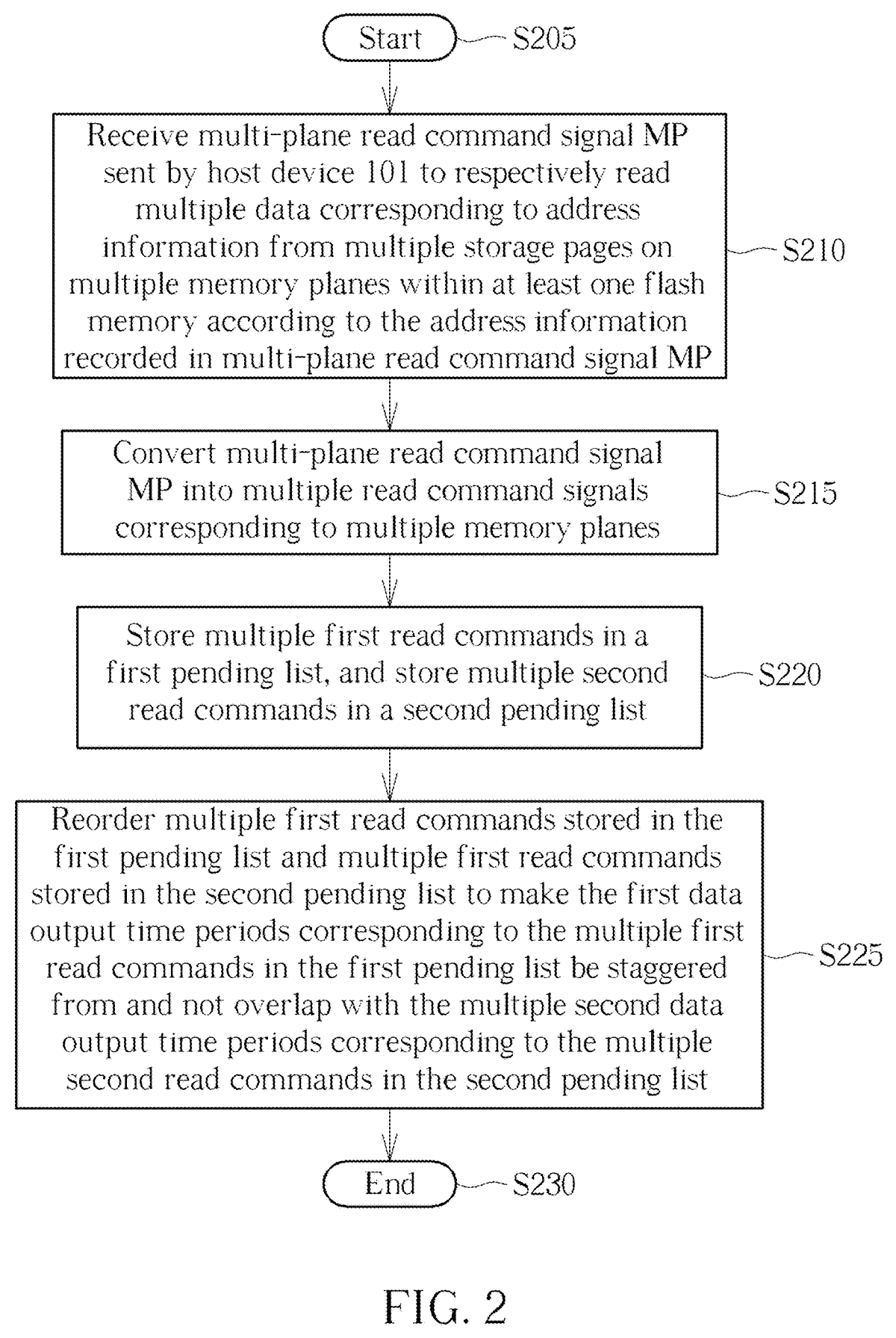

Start —— S205

Receive multi-plane read command signal MP sent by host device 101 to respectively read multiple data corresponding to address information from multiple storage pages on multiple memory planes within at least one flash memory according to the address information recorded in multi-plane read command signal MP —— S210

Convert multi-plane read command signal MP into multiple read command signals corresponding to multiple memory planes —— S215

Store multiple first read commands in a first pending list, and store multiple second read commands in a second pending list —— S220

Reorder multiple first read commands stored in the first pending list and multiple first read commands stored in the second pending list to make the first data output time periods corresponding to the multiple first read commands in the first pending list be staggered from and not overlap with the multiple second data output time periods corresponding to the multiple second read commands in the second pending list —— S225

End —— S230

FIG. 2

FLASH MEMORY CONTROLLER AND DATA READING METHOD OF FLASH MEMORY CONTROLLER CAPABLE OF ENHANCING AND MAXIMIZING PERFORMANCE OF READ OPERATIONS

BACKGROUND OF THE INVENTION

1. Field of the Invention

The present invention relates to a flash memory reading scheme, and more particularly to a flash memory controller and a data reading method of the flash memory controller.

2. Description of the Prior Art

Generally speaking, when a conventional flash memory device operates in n a sequential read operation (or scenario), the conventional flash memory controller issues a multi-plane read command into a flash memory to read the multiple data of multiple storage pages having the same storage page type at the same address of multiple different memory planes of the flash memory. The multiple data of the multiple storage pages will first be read out and temporarily stored in a buffer in the flash memory, and then the multiple data are transmitted from the buffer to the conventional flash memory controller through a bus. However, since the read times of multiple storage pages having the same storage page type are the same or similar, the transmission of data on one memory plane has to wait until the other data on other memory planes are transferred by the bus. The data can be transmitted only after the other data are transmitted by the bus. This wastes a lot of time in the process of waiting for the bus, and results in low reading performance.

SUMMARY OF THE INVENTION

Therefore one of the objectives of the present invention is to provide a flash memory controller and a data reading method of the flash memory controller, to solve the problems of the existing technology.

According to embodiments of the present invention, a flash memory controller is disclosed. The flash memory controller is to be coupled to at least one flash memory through a specific bus, and the at least one flash memory includes multiple memory planes. Each memory plane includes multiple storage blocks, and each storage block includes multiple storage pages. The flash memory controller comprises a controller circuit and a scheduler circuit. The controller circuit is used for receiving a multi-plane read command signal sent by a host device to respectively read multiple data from multiple storage pages, corresponding to an address information, on the multiple memory planes within the at least one flash memory according to the address information recorded in the multi-plane read command signal, and the controller circuit includes multiple pending lists respectively corresponding to the multiple memory planes. The scheduler circuit is coupled to the controller circuit, and is used for reordering data stored in the multiple pending lists. The controller circuit converts the multi-plane read command signal into multiple read command signals corresponding to the multiple memory planes. The multiple read command signals comprise multiple first read commands and multiple second read commands. The multiple first read commands are used for reading multiple sub-storage pages of a storage page on a first memory plane, and the multiple second read commands are used for reading multiple sub-storage pages of a storage page on a second memory plane. The controller circuit is used to temporarily store the multiple first read commands in a first pending list and store the multiple second read commands in a second pending list, and the scheduler circuit is used to reorder the multiple first read commands temporarily stored in the first pending list and reorder the multiple second read commands temporarily stored in the second pending list, to make multiple first data output time periods respectively corresponding to the multiple first read commands in the first pending list be staggered from and not overlap with multiple second data output times respectively corresponding to the multiple second read commands in the second pending list.

According to embodiments of the present invention, a data reading method of a flash memory controller is disclosed. The flash memory controller is coupled to at least one flash memory through a specific bus. The at least one flash memory includes multiple memory planes. Each memory plane including multiple storage blocks, and each storage block includes multiple storage pages. The data reading method comprises: using a controller circuit to receive a multi-plane read command signal sent by a host device to respectively read multiple data from multiple storage pages, corresponding to an address information, on the multiple memory planes within the at least one flash memory according to an address information recorded in the multi-plane read command signal, the controller circuit including multiple pending lists respectively corresponding to the multiple memory planes; converting the multi-plane read command signal into multiple read command signals corresponding to the multiple memory planes, the multiple read command signals comprising multiple first read commands and multiple second read commands, the multiple first read commands being used for reading multiple sub-storage pages of a storage page on a first memory plane, the multiple second read commands being used for reading multiple sub-storage pages of a storage page on a second memory plane; temporarily storing the multiple first read commands in a first pending list and storing the multiple second read commands in a second pending list; and, reordering the multiple first read commands temporarily stored in the first pending list and reordering the multiple second read commands temporarily stored in the second pending list, to make multiple first data output time periods respectively corresponding to the multiple first read commands in the first pending list be staggered from and not overlap with multiple second data output times respectively corresponding to the multiple second read commands in the second pending list.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a schematic diagram of the operation flow of the flash memory controller as shown in FIG. 1.

DETAILED DESCRIPTION

The present invention aims at providing a technical solution and method for asynchronous independent plane read (AIPR) of a flash memory device, e.g. an asynchronous independent plane scheduling management method and system for read commands, to enhance and maximize the performance of read operations. The present invention can recombine the sequence of multiple read commands actually corresponding to a multi-plane read command signal to reorder/reschedule the sequence of the multiple different read commands corresponding to the storage pages having different types so as to improve the utilization efficiency of the bus, so that the bus can complete the output/transmission of data as early as possible, thereby increasing the speed of data reading. When a flash memory controller actually issues a read command to the flash memory, it needs to wait for a read time (or called read delay time) for reading a corresponding data from the flash memory and also wait for a data output time period for returning the corresponding data to the flash memory controller. Therefore, by rescheduling the order/sequence of multiple different read commands corresponding to multiple different types of storage pages, this can effectively reduce the bus' resource and time which are occupied by the read operations so as to improve the efficiency of bus utilization.

Figure 1:
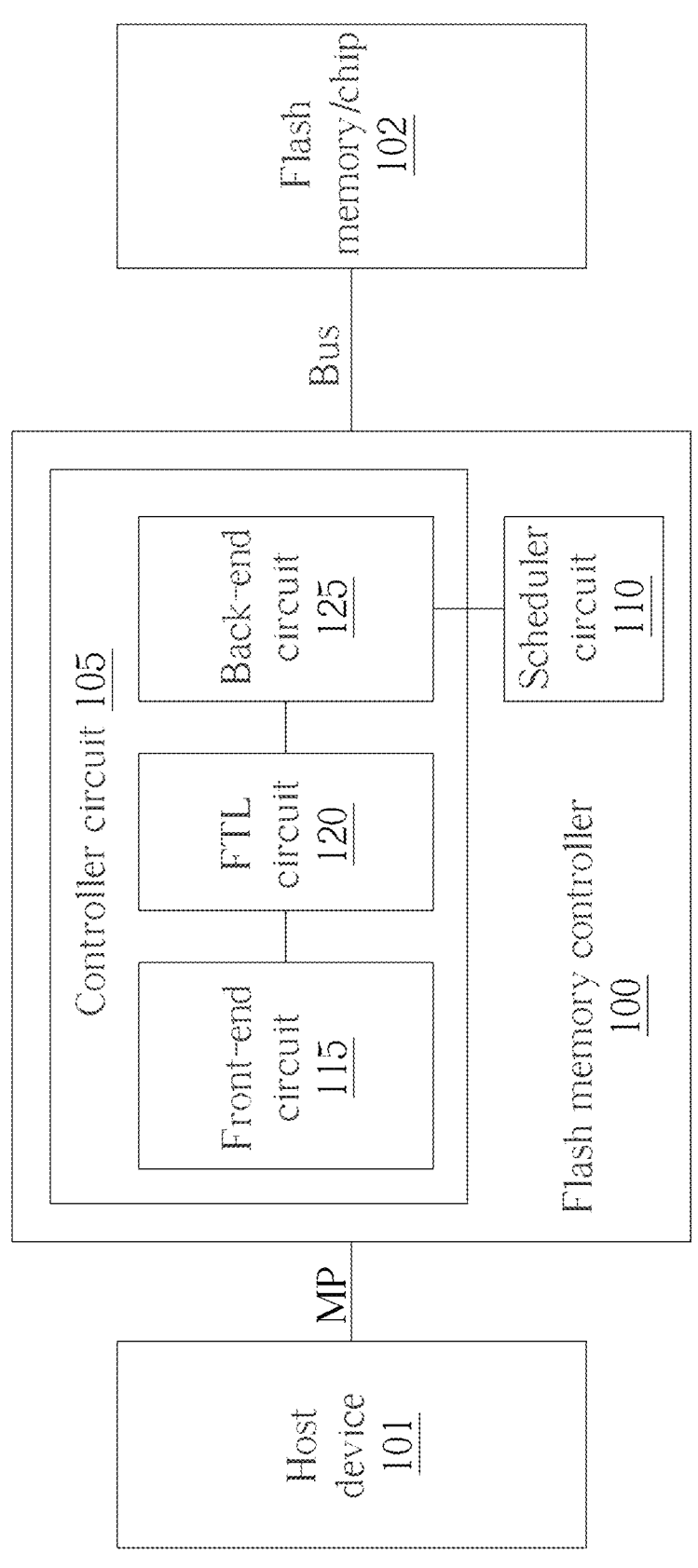
FIG. 1 is a schematic diagram of a flash memory controller according to an embodiment of the present invention.

Please refer to FIG. 1 in conjunction with FIG. 2. FIG. 1 is a schematic diagram of a flash memory controller 100 according to an embodiment of the present invention. FIG. 2 is a schematic diagram of the operation flow of the flash memory controller 100 as shown in FIG. 1. The flash memory controller 100 is coupled between the host device 101 (e.g. a computer device) and at least one flash memory 101 and is used to couple to the at least one flash memory 101 through a specific bus. The flash memory 101 is, for example, a flash memory chip (or chiplet). The at least one flash memory 101 includes multiple memory planes, and each memory plane includes multiple storage blocks. Each block includes multiple storage pages, and each storage page for example (but not limited to) may include multiple sub-storage pages. The flash memory controller 100 includes a controller circuit 105 and a scheduler circuit 110.

As shown in FIG. 2, the operation flow starts from Step S205. In Step S210, the controller circuit 105 is used to receive a multi-plane read command signal MP sent by the host device 101, so as to respectively read multiple data corresponding to the address information from multiple storage pages on the multiple memory planes within the at least one flash memory 102 according to the address information recorded in the multi-plane read command signal MP. The controller circuit 105 has multiple pending lists respectively corresponding to the multiple memory planes. For example, four memory planes are associated with four corresponding pending lists, and each pending list can be implemented by using a first-in-first-out queue. In Step S215, for example, the controller circuit 105 converts the multi-plane read command signal MP into multiple read command signals corresponding to the multiple memory planes. The multiple read command signals include multiple first read commands for reading multiple sub-storage pages of one storage page on a first memory plane and multiple second read commands for reading multiple sub-storage pages of one storage page on a second memory plane. In Step S220, the controller circuit 105 is used to temporarily store the multiple first read commands in a first pending list, and store the multiple second read commands in a second pending list. Then, in Step S225, the scheduler circuit 110 is used to reorder the sequence of the multiple first read commands temporarily stored in the first pending list and the sequence of the multiple first read commands temporarily stored in the second pending list, to make the first data output time periods corresponding to the multiple first read commands in the first pending list be staggered from and not overlap with the multiple second data output time periods corresponding to the multiple second read commands in the second pending list. The operation process ends at Step S230.

In one embodiment, in practice, as shown in FIG. 1, the controller circuit 105 includes a front-end circuit 115, a flash translation layer (FTL) circuit 120, and a back-end circuit 125. The front-end circuit 115 is used to receive the multi-plane read command signal MP sent by the host device 101. The FTL circuit 120 is coupled to the front-end circuit 115 and used to convert or translate the multi-plane read command signal MP into multiple read command signals corresponding to the multiple memory planes. The back-end circuit 125 is coupled to the FTL circuit 120 and is used to temporarily store the multiple first read commands in the first pending list, store the multiple second read commands in the second pending list, and respectively perform a sequential read operation upon the first memory plane and the second memory plane according to the reordered information of the first pending list and the reordered information of the second pending list. In other words, the scheduler circuit 110 at first reorders the multiple read commands in the pending lists, and the backend circuit 125 performs the sequential read operations based on the reordered results so that the flash memory 102 can output corresponding storage page data according to the sequence of reordered result instead of outputting data based on the order of the read commands generated from the FTL circuit 120, so as to avoid or reduce the waiting time for the specific bus becoming idle and optimize the read performance of the overall flash memory device.

Figure 3:
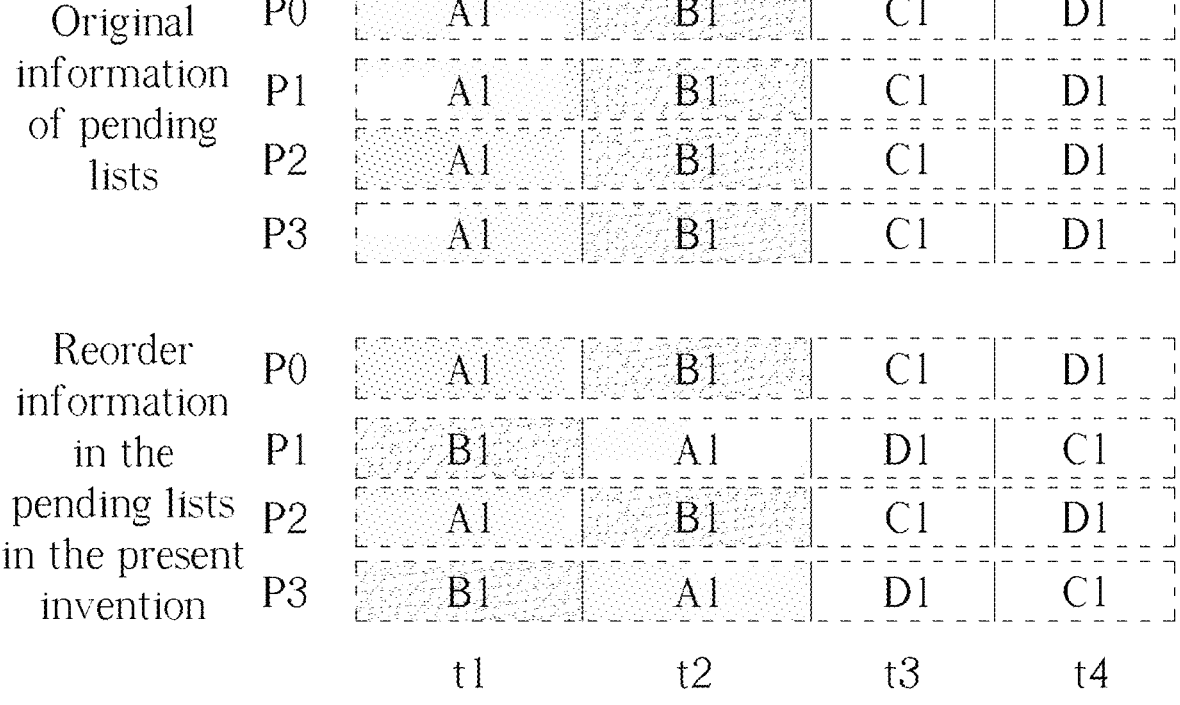
FIG. 3 is a schematic diagram of the comparison between the result of reordering commands in multiple pending lists according to an embodiment of the present invention and the original pending list that has not been reordered.

Please refer to FIG. 3. FIG. 3 is a schematic diagram of the comparison between the result of reordering commands in multiple pending lists according to an embodiment of the present invention and the original pending list that has not been reordered. As shown in FIG. 3, for example, the flash memory chip 102 has four memory planes P0, P1, P2, and P3. Each memory plane corresponds to a pending list. Therefore, the controller circuit 105 has four pending lists respectively corresponding to the four memory planes P0, P1, P2, and P3. A multi-plane read command, used for reading a storage page (e.g. it has four sub-storage pages) located at a specific address is translated into four read commands such as read commands A1 for reading first sub-storage pages at the specific address on the memory planes P0, P1, P2, P3, another four read commands such as read commands B1 for reading second sub-storage pages at the specific address on the memory planes P0, P1, P2, P3, another four read commands such as read commands C1 for reading third sub-storage pages at the specific address on the memory planes P0, P1, P2, P3, and another four read commands such as read commands D1 for reading fourth sub-storage pages at the specific address on the memory planes P0, P1, P2, P3. Thus, each pending list includes, for example, the read commands A1, B1, C1, and D1 of four different sub-storage pages before the original information of the pending is not yet reordered.

In this embodiment, the scheduler circuit 110 reorders a portion of the read commands recorded in the four pending lists to avoid executing too many data read and output operations of sub-storage pages having the same type at the same time point. For example, a pending list corresponding to the memory plane P0 has not been reordered, and the read commands A1, B1, C1, and D1 are temporarily stored at time points t1, t2, t3, and t4. The result of the pending list corresponding to the memory plane P1, which has been reordered, indicates that the read commands temporarily stored at time points t1, t2, t3, and t4 are B1, A1, D1, and C1. A pending list corresponding to the memory plane P2 is not reordered, and the read commands temporarily stored at time points t1, t2, t3, and t4 are A1, B1, C1, and D1. The result of a pending list corresponding to the memory plane P3, which has been reordered, indicates that the read commands temporarily stored at time points t1, t2, t3, and t4 are B1, A1, D1, and C1. In this way, the data read and output operations performed upon the same type of sub-storage pages on the all memory planes do not occur at the same point such as t1. For example, For example, after reordering the read commands, the data read and output operations performed upon the same type of sub-storage pages occur on only two memory planes instead of occurring on all the four memory planes. This can effectively avoid the problem of excessive preemption of resources on that specific bus.

In addition, in one embodiment, the multiple first read commands may correspond to multiple read times (tR) having different time lengths, wherein a read time refers to a read latency during which the flash memory 102 actually receives a read command, reads data of a storage page (or a sub-storage page), and finally outputs the read data from the storage page into a buffer of the flash memory 102. The multiple first data output time periods and the multiple second data output time periods are multiple data output time periods during which data is outputted from the at least one flash memory 102 into the flash memory controller 100 through the specific bus. For example, a storage page at the address information (such as a specific address) on the first t memory plane includes three sub-storage pages, i.e. a lower data page, a middle data page, and an upper data page. The multiple first read commands may be three read commands used to respectively read data of the lower data page, the middle data page, and the upper data page, and may respectively correspond to three different read times having different time lengths. Similarly, the multiple second read commands may be another three read commands used to respectively read data of a storage page (it also includes the lower data page, the middle data page, and the upper data page) at the same address data (i.e. the specific address) on the second memory plane, and may respectively correspond to three different read times having different time lengths. In other words, the multiple first read commands are used to read the data of multiple sub-storage pages of a storage page corresponding to the specific address on the first memory plane, and the multiple second read commands are used to read data of multiple sub-storage pages of another storage page corresponding to the specific address on the second memory plane. The scheduler circuit 110 is used to calculate multiple expected start time points and multiple expected end time points of multiple first data output time periods corresponding to the multiple first read commands and calculate multiple expected start time points and multiple expected end time points of multiple second data output time periods corresponding to the multiple second read commands, and it is used to reorder the multiple first read commands and the multiple second read commands in the pending lists, so that the multiple first data output time periods can be staggered from and do not overlap with the multiple second data output time periods as much as possible when the back-end circuit 125 performs the sequential read operations based on the reordered command results.

Figure 4:
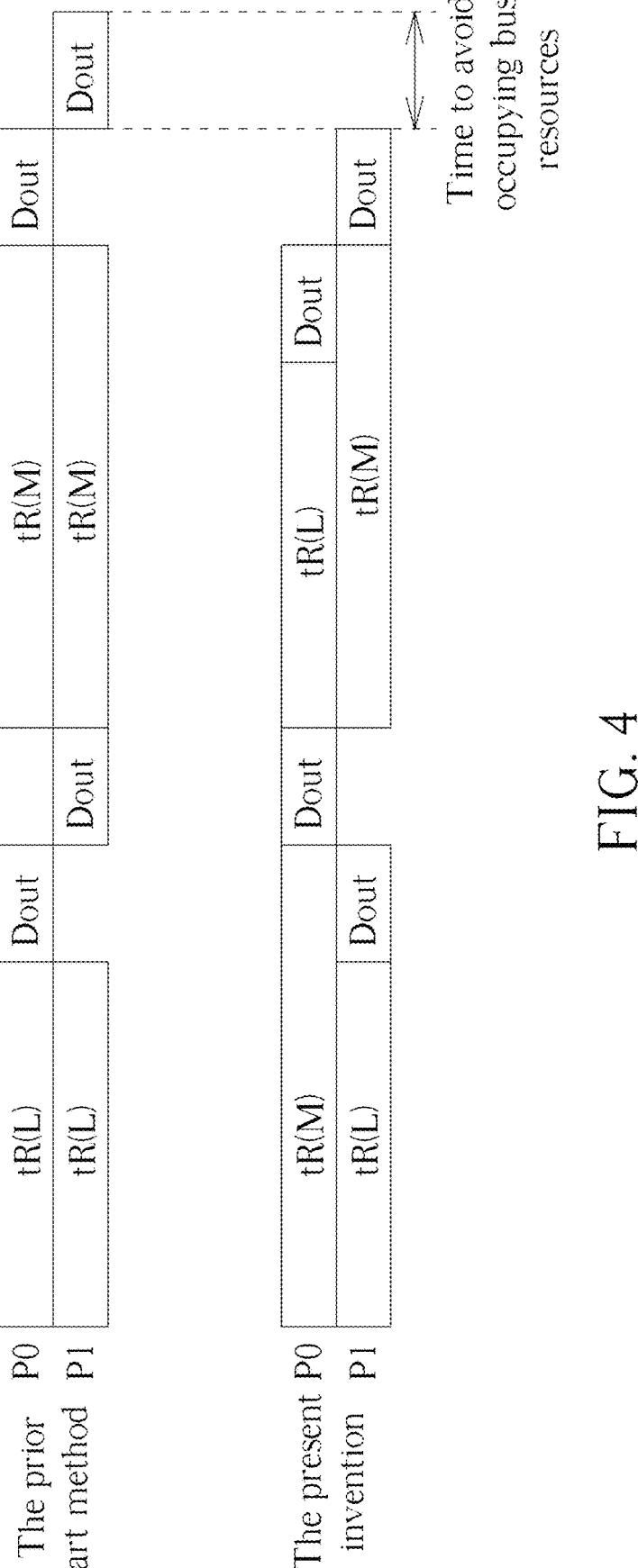
FIG. 4 is a schematic diagram of the comparison between the prior art method and data reading and outputting after the result of reordering the commands in multiple pending lists according to an embodiment of the present invention.

Please refer to FIG. 4. FIG. 4 is a schematic diagram of the comparison between the prior art method and data reading and outputting after the result of reordering the commands in multiple pending lists according to an embodiment of the present invention. As shown in FIG. 4, for the example of two memory planes P0 and P1, the prior art method may simultaneously read the sub-storage pages having the same type. For example, the prior art method simultaneously performs the read operations upon lower data pages respectively on the two memory planes P0 and P1, and the corresponding read times are identical and indicated by tR(L). The read times tR(L) of the two memory planes P0 and P1 almost end at the same time. In this situation, for example, the bus at first may output the data of a lower data page on the memory plane P0 into the flash memory controller, and the first Dout indicates the corresponding data output time period. After the data output is finished, the bus then outputs the data of the lower data page on the memory plane P1 into the flash memory controller, and the second Dout indicates the corresponding data output time period. Then, the prior art method simultaneously performs the read operations upon middle data pages respectively on the two memory planes P0 and P1, and the corresponding read times are identical and indicated by tR(M). The read times tR(M) of the two memory planes P0 and P1 almost end at the same time. In this situation, for example, the bus at first may output the data of a middle data page on the memory plane P0 into the flash memory controller, and the third Dout indicates the corresponding data output time period. After the data output is finished, the bus then outputs the data of the middle data page on the memory plane P1 into the flash memory controller, and the fourth Dout indicates the corresponding data output time period.

Compared to the prior art method, the embodiments of the present invention for example simultaneously performs read operations upon the sub-storage pages having different types. For example, the present invention may simultaneously read a middle data page and a low data page for the memory planes P0 and P1. The read time tR(M) of the middle data page is longer than the read time tR(L) of the lower data page, and the read time tR(L) of the lower data page of the memory plane P1 will end early. For example, the specific bus will at first output the data of the low data page on the memory plane P1 into the flash memory controller 100, wherein the first Dout represents the data output time period of the low data page on the memory plane P1. When the read time tR(M) of the middle data page of the memory plane P0 ends, the time period of the first Dout may also end or end early, and thus the specific bus can be used to immediately output the data of the middle data page on the memory plane P0 into the flash memory controller 100 without waiting for other data outputs. The second Dout represents the data output time period of the middle data page on the memory plane P0. Then, after the second Dout time point ends, the present invention may simultaneously read a lower data page and a middle data page for the memory planes P0 and P1. The read time tR(M) of the middle data page is longer than the read time tR(L) of the lower data page, and the read time tR(L) of the lower data page of the memory plane P0 will end early. For example, the specific bus will at first output the data of the low data page on the memory plane P0 into the flash memory controller 100, wherein the third Dout represents the data output time period of the low data page on the memory plane P0. When the read time tR(M) of the middle data page of the memory plane P1 ends, the time period of the third Dout may also end or end early, and thus the specific bus can be used to immediately output the data of the middle data page on the memory plane P1 into the flash memory controller 100 without waiting for other data outputs. The fourth Dout represents the data output time period of the middle data page on the memory plane P1. By doing so, this can avoid preempting bus resources and prevent excessive time consumption for the specific bus.

Figure 5:
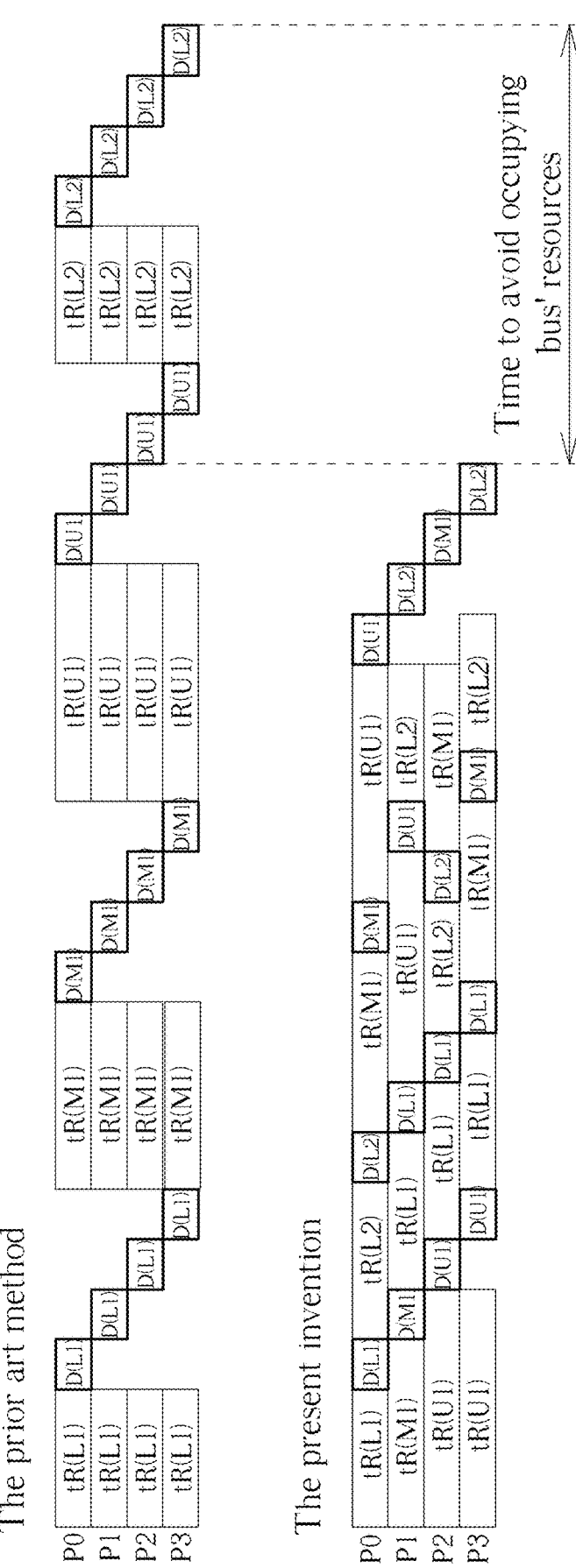
FIG. 5 is a schematic diagram of the comparison between the prior art method and data reading and outputting after the result of reordering the commands in multiple pending lists according to another embodiment of the present invention.

Please refer to FIG. 5. FIG. 5 is a schematic diagram of the comparison between the prior art method and data reading and outputting after the result of reordering the commands in multiple pending lists according to another embodiment of the present invention. As shown in FIG. 5, for the example of four memory planes P0, P1, P2, and P3, the horizontal direction shows the chronological order, and the prior art method may perform read operations simultaneously upon the sub-storage pages having the same type on the four memory planes P0, P1, P2, P3. For example, the prior art method may perform the read operations simultaneously upon multiple lower data pages L1 respectively on the four memory planes P0, P1, P2, P3, and the read time is tR(L1). Then, the prior art method may simultaneously read multiple middle data pages M1 on the four memory planes P0, P1, P2, and P3, and the read time is tR(M1). Then, the prior art method may simultaneously read multiple upper data pages U1 respectively on the four memory planes P0, P1, P2, P3, and the read time is tR(U1). Finally, the prior art method may simultaneously read other multiple lower data pages U2 respectively on the four memory planes P0, P1, P2, P3, and its read time is tR(L2). Thus, as shown in FIG. 5, at the end of the read time tR(L1) of the lower data page L1, the specific bus needs to occupy four data output time periods D(L1) to sequentially transfer the four data of lower data pages L1 respectively on the four memory planes P0, P1, P2, and P3 into the flash memory controller. The execution of outputting the data of the lower data page L1 on the memory plane P1 in the prior art method needs to wait for a time period until the data output time period of the lower data page L1 on the memory plane P0 is ended. The execution of outputting the data of the lower data page L1 on the memory plane P2 in the prior art method needs to wait for a time period until the data output time period of the lower data page L1 on the memory plane P1 is ended. The execution of outputting the data of the lower data page L1 on the memory plane P3 in the prior art method needs to wait for a time period until the data output time period of the lower data page L1 on the memory plane P2 is ended.

Similarly, in the prior art method, at the end of the read time tR(M1) of the middle data page M1, the specific bus needs to occupy four data output time periods D(M1) to sequentially transfer four data of the four middle data pages M1 respectively on the four memory planes P0, P1, P2, P3 into the flash memory controller. The execution of outputting the data of the middle data page M1 on the memory plane P1 in the prior art method needs to wait for a time period until the data output time period of the middle data page M1 on the memory plane P0 is ended. The execution of outputting the data of the middle data page M1 on the memory plane P2 in the prior art method needs to wait for a time period until the data output time period of the middle data page M1 on the memory plane P1 is ended. The execution of outputting the data of the middle data page M1 on the memory plane P3 in the prior art method needs to wait for a time period until the data output time period of middle data page M1 on the memory plane P2 is ended.

In the prior art method, at the end of the read time tR(U1) of the upper data page U1, the specific bus needs to occupy four data output time periods D(U1) to sequentially transfer four data of the four upper data pages U1 respectively on the four memory planes P0, P1, P2, P3 into the flash memory controller. The execution of outputting the data of the upper data page U1 on the memory plane P1 in the prior art method needs to wait for a time period until the data output time period of the upper data page U1 on the memory plane P0 is ended. The execution of outputting the data of the upper data page U1 on the memory plane P2 in the prior art method needs to wait for a time period until the data output time period of the upper data page U1 on the memory plane P1 is ended. The execution of outputting the data of the upper data page U1 on the memory plane P3 in the prior art method needs to wait for a time period until the data output time period of the upper data page U1 on the memory plane P2 is ended.

Similarly, in the prior art method, at the end of the read time tR(L2) of the lower data page L2, the specific bus needs to occupy four data output time periods D(L2) to sequentially transfer the four data of other lower data pages L2 respectively on the four memory planes P0, P1, P2, and P3 into the flash memory controller. The execution of outputting the data of the lower data page L2 on the memory plane P1 in the prior art method needs to wait for a time period until the data output time period of the lower data page L2 on the memory plane P0 is ended. The execution of outputting the data of the lower data page L2 on the memory plane P2 in the prior art method needs to wait for a time period until the data output time period of the lower data page L2 on the memory plane P1 is ended. The execution of outputting the data of the lower data page L2 on the memory plane P3 in the prior art method needs to wait for a time period until the data output time period of the lower data page L2 on the memory plane P2 is ended.

As shown in FIG. 5, compared to the prior art method, after the scheduler circuit 110 reorders the read commands in the four pending lists, the flash memory/chip 102 in the embodiments of the present invention can try to read the sub-storage pages having different types on different memory planes at the same time to minimize the waiting time that the specific bus needs to wait for the previous data output to be completed before the next data output can be performed. For reordering the read commands, the scheduler circuit 110 for example reorders the information of a pending list corresponding to the memory plane P0 to make the reordered information sequentially include four read commands used for reading the lower data page L1, the lower data page L2, the middle data page M1, and the upper data page U1, reorders the information of a pending list corresponding to the memory plane P1 to make the reordered information sequentially include four read commands used for reading the middle data page M1, the lower data page L1, the upper data page U1, and the lower data page L2, reorders the information of a pending list corresponding to the memory plane P2 to make the reordered information sequentially include four read commands used for reading the upper data page U1, the lower data page L1, the lower data page L2, and the middle data page M1, and reorders the information of a pending list corresponding to the memory plane P3 to make the reordered information sequentially include four read commands used for reading the upper data page U1, the lower data page L1, the middle data page M1, and the lower data page L2. This is not intended to be a limitation of the present invention.

For example, the flash memory/chip 102 in the present invention at first simultaneously performs read operations upon a lower data page L1, a middle data page M1, an upper data page U1, and an upper data page U1 respectively on the memory planes P0, P1, P2, and P3, and their corresponding read times are tR(L1), tR(M1), tR(U1), and tR(U1). Therefore, at the end of the read time tR(L1) of the lower data page L1 on the memory plane P0, the specific bus can immediately output the data of the lower data page L1 on the memory plane P0 into the flash memory controller 100, and D(L1) represents the data output time period of the lower data page L1 on the memory plane P0.

Then, when the read time tR(M1) of the middle data page M1 on the memory plane P1 ends, the data output time period D(L1) of the memory plane P0 also ends or ends early and then the flash memory/chip 102 reads the lower data page L2 on the memory plane P0 (its read time is tR(L2)), so that the specific bus can immediately output the data of middle data page M1 on the memory plane P1 into the flash memory controller 100 without waiting. D(M1) represents the data output time period of the middle data page M1 on the memory plane P1.

Then, when the read time tR(U1) of the upper data page U1 on the memory plane P2 ends, the data output time period D(M1) of the memory plane P1 also ends or ends early and then the flash memory/chip 102 reads the lower data page L1 of the memory plane P1 (its read time tR(L1)), so that the specific bus can immediately output the data of upper data page U1 of the memory plane P2 into the flash memory controller 100 without waiting. D(U1) represents the data output time period of the upper data page U1 on the memory plane P2. At this time, when the read time tR(U1) of the upper data page U1 of the memory plane P2 ends and then the flash memory/chip 102 reads the lower data page L1 of the memory plane P2 (its read time tR(L1)), the read time tR(U1) of the upper data page U1 of the memory plane P3 also ends at the same time, and in this situation the specific bus needs to wait for the end of the data output time period D(U1) of the upper data page U1 on the memory plane P2 and to immediately output the data of the upper data page U1 on the memory plane P3 into the flash memory controller 100 after the end of the data output time period D(U1) of the upper data page U1 on the memory plane P2 occurs. D(U1) represents the data output time period of the middle data page U1 of the memory plane P3.

Similarly, as shown in FIG. 5, when the specific bus outputs the data of the lower data page L2 of the memory plane P0 (i.e. the data output time period D(L2) of the memory plane P0), the read operations are still performed upon the lower data pages L1 of the memory planes P1, P2, and P3 of the flash memory/chip 102 respectively, and the read times are tR(L1). Therefore, the specific bus can start to read the data of the lower data page L2 of the memory plane P0 without waiting. When the specific bus outputs the data of the lower data page L1 of the memory plane P1 (i.e. the data output time period D(L1) of the memory plane P1), a read operation for example may be still performed upon the middle data page M1 of the memory plane P of the flash memory/chip 102 (the read time is tR(M1)) while two read operations are still performed upon the lower data pages L1 of the memory planes P2 and P3 (the read times are tR(L1)). Thus, the specific The bus can start to output the data of the lower data page L1 of the memory plane P1 without waiting. When the specific bus outputs the data of the lower data page L1 of the memory plane P2 (i.e. the data output time period D(L1) of the memory plane P2), the middle data page M1 of the memory plane P0 of the flash memory/chip 102 is being read for a read time tR(M1), the upper data page U1 of the memory plane P1 of the flash memory/chip 102 is being read for a read time tR(U1), and the lower data page L1 of the memory plane P3 is being still read for the read time tR(L1). Therefore, the specific bus does not need to wait and can immediately start to output the data of the lower data page L1 of memory plane P2. When the specific bus outputs the data of the lower data page L1 of the memory plane P3 (i.e. the data output time period D(L1) of the memory plane P3), the middle data page M1 of the memory plane P0 of the flash memory/chip 102 is being read for a read time tR(M1), the upper data page U1 of the memory plane P1 of the flash memory/chip 102 is being read for a read time tR(U1), and another lower data page L2 of the memory plane P3 is being read for a read time tR(L2). Therefore, the specific bus does not need to wait and can immediately start to output the data of the lower data page L1 of memory plane P3.

Similarly, when the specific bus outputs the data of the middle data page M1 of the memory plane P0 (i.e. the data output time period D(M1) of the memory plane P0), the upper data page U1 of the memory plane P1 of the flash memory/chip 102 is being read for a read time tR(U1), the lower data page L2 of the memory plane P2 of the flash memory/chip 102 is being read for a read time tR(L2), and the middle data page M1 of the memory plane P3 of the flash memory/chip 102 is being read for the read time tR(M1), so the specific bus does not need to wait and can immediately start to output the data of the middle data page M1 of the memory plane P0. In addition, when the specific bus outputs the data of the upper data page U1 of the memory plane P1 (i.e. the data output time period D(U1) of the memory plane P1), for example the upper data page U1 of the memory plane P0 of the flash memory/chip 102 is being read for the read time tR(U1) while the middle data pages M1 of the memory planes P2 and P3 are also being read respectively for the read time tR(M1). Therefore, the specific bus can start to output the data of the upper data page U1 of the memory plane P1 without waiting. In addition, when the specific bus outputs the data of the lower data page L2 of the memory plane P2 (i.e. the data output time period D(L2) of the memory plane P2), the upper data page U1 of the memory plane P0 of the flash memory/chip 102 is being read for the read time tR(U1), the upper data page U1 of the memory plane P1 of the flash memory/chip 102 is still being read for the read time tR(U1), and the middle data page M1 of the memory plane P3 is still being read for the read time tR(M1), so that the specific bus does not need to wait and can immediately start to output the data of the lower data page L2 of the memory plane P2. In addition, when the specific bus outputs the data of the middle data page M1 of the memory plane P3 (i.e. the data output time period D(M1) of the memory plane P3), the upper data page U1 of the memory plane P0 of the flash memory/chip 102 is being read for the read time tR(U1), the lower data page L2 of the memory plane P1 of the flash memory/chip 102 is being read for the read time tR(L2), and the middle data page M1 of the memory plane P3 is being read for the read time tR(M1). Therefore, the specific bus does not need to wait and can immediately start to output the data of the middle data page M1 of the memory plane P3. Finally, the specific bus sequentially outputs the data of the upper data page U1 of the memory plane P0, the data of the lower data page L2 of the memory plane P1, the data of the middle data page M1 of the memory plane P2, and the data of the lower data page L2 of the memory plane P3, and the data output time periods sequentially are D(U1), D(L2), D(M1), and D(L2). In this way, by reordering multiple read commands in the present invention, excessive occupation of resources and time waiting for the bus can be effectively avoided.

In another embodiment, the scheduler circuit 110 is used to reorder the multiple first read commands temporarily stored in the first pending list and to reorder the multiple second read commands temporarily stored in the second pending list, to minimize a waiting time of that the specific bus.

In addition, in one embodiment, when reordering the information, the scheduler circuit 110 is used to calculate multiple expected start time points and multiple expected end time points of the multiple first data output time periods and calculate multiple expected start time points and multiple expected end time points of the multiple second data output time periods, to minimize a waiting time of the specific bus and to reorder the information buffered in the first pending list and in the second pending list.

Further, in practice, in another embodiment, when the controller circuit 105 needs or decides to issue a specific read command corresponding to an idle memory plane, the scheduler circuit 110 is used to determine a type of a sub-storage page of a storage page to be read by the specific read command to make a specific data output time period corresponding to the specific read command be able to be staggered between the multiple first data output time periods and the multiple second data output time periods. For example, the scheduler circuit 110 may determine that the specific read command is used to read a particular sub-storage page of a corresponding storage page at the specific address on the idle memory plane, e.g. determining which sub-storage page in the storage page such as determining which one of the lower data page, the middle data page, and the upper data page (but not limited to).

Specifically, when determining which sub-storage page it is, the scheduler circuit 110 tries and determines whether the determined sub-storage page satisfies at least one specific inequality condition for each of all possible sub-storage page types. For example, taking a sub-storage page type being a the j-th sub-storage page as an example, a read time corresponding to the j-th sub-storage page is $t_R(j)$, a start time point of a read task on the i-th other memory plane is $T_{left}(i)=T_{start}(i)-T_{cur}$, an end time point of the read task is $T_{right}(i)=T_{end}(i)-T_{cur}$. $T_{cur}$ is a current time point. $T_{start}(i)$ is the expected start time point of the read task, and $T_{end}(i)=T_{start}(i)+t_{Dout}$ is the expected end time point of the read task. $t_{Dout}$ is the length of a corresponding data output time period. In this situation, when the scheduler circuit 110 determines which the sub-storage page type is, the scheduler circuit 110 is to make $t_R(j)$ satisfy at least one of the following two inequality conditions:

$$t_R(j)+t_{Dout}<T_{left}(i); \text{ or}$$

$$t_R(j)>T_{right}(i).$$

That is to say, the start time point $T_{left}(i)$ of the read task on the i-th other memory plane can be regarded as the expected start time point in the future when the read task needs to occupy the specific bus for data output. The end time point $T_{right}(i)$ of the read task on the i-th other memory plane can be regarded as the expected end time point in the future when the read task needs to occupy the specific bus for data output. When determining the sub-storage page type, the scheduler circuit 110 is used to strive to avoid that a data output time period, on the specific bus and corresponding to the determined sub-storage page type, is between $T_{left}(i)$ and $T_{right}(i)$, so as to strive to avoid needing to wait for the specific bus to complete the data transmissions and outputs of the other memory planes. That is to say, when the scheduler circuit 110 selects the sub-storage page type, it only needs to make the selected sub-storage page type satisfy the inequality condition $t_R(j)+t_{Dout}<T_{left}(i)$ or satisfy the inequality condition $t_R(j)>T_{right}(i)$. That is, the time point at which the reading of the sub-storage page type is completed and the data output on the specific bus is completed is before the start time point $T_{left}(i)$ of the read task of the i-th other memory plane, or the time point at which the reading of the sub-storage page type is completed is after the end time point $T_{right}(i)$ of the read task of the i-th other memory plane. It should be noted that the scheduler circuit 110 performs the above-mentioned inequality condition judgment upon the start time point and end time point of a task on each other memory plane, to avoid that a data output time period corresponding to the determined sub-storage page type on the specific bus collide with (or overlap with) the data output time periods of other memory planes, so as to avoid needing to wait for the specific bus to complete the data transmission and output of other memory planes before the data of the determined sub-storage page type can be outputted.

In addition, in another embodiment, when the controller circuit 105 needs or decides to issue a specific read command corresponding to an idle memory plane, the scheduler circuit 110 is used to determine a type of a sub-storage page to be read by the specific read command to minimize a waiting time of the specific bus. For example, the scheduler circuit 110 may determine that the specific read command is used to read a particular sub-storage page of a corresponding storage page at the specific address on the idle memory plane, e.g. determining which sub-storage page in the corresponding storage page such as determining which one of the lower data page, the middle data page, and the upper data page (but not limited).

Similarly, when determining which the sub-storage page is, the scheduler circuit 110 tries and determines whether the determined sub-storage page satisfies a specific condition for each of the all possible sub-storage page types. For example, taking a sub-storage page type indicating a j-th sub-storage page as an example, a read time corresponding to the j-th sub-storage page is $t_R(j)$. A start time point of a read task on the i-th memory plane is $T_{left}(i)=T_{start}(i)-T_{cur}$. An end time point of the read tasks is $T_{right}(i)=T_{end}(i)-T_{cur}$. $T_{cur}$ is a current time point. $T_{start}(i)$ is the expected start time point of the read task. $T_{end}(i)=T_{start}(i)+t_{Dout}$ is the expected end time point of the read task. $t_{Dout}$ is the length of a corresponding data output time period. In this situation, when determining the type of the sub-storage page, the scheduler circuit 110 is used to make $t_R(j)$ satisfy the following condition:

$$\text{Min}(\text{Min}(|t_R(j)+t_{Dout}-T_{left}(i)|),\text{Min}(|t_R(j)-T_{right}(i)|)).$$

That is to say, the start time point $T_{left}(i)$ of the read task on the i-th other memory plane can be regarded as the expected start time point in the future when the read task occupies the specific bus for data output, and the end time point $T_{right}(i)$ of the read task on the i-th other memory plane can be regarded as the expected end time point in the future when the read task occupies the specific bus for data output. When determining the sub-storage page type, the scheduler circuit 110 tries to minimize a portion time, which is between $T_{left}(i)$ and $T_{right}(i)$, of an original data output time period on the specific bus corresponding to the sub-storage page type, to minimize the portion time overlapped with other data output time period(s) so as to resultantly minimize a waiting time of the specific bus. In other words, when there is a possibility that an original data output time period corresponding to each of all possible sub-storage page types on the specific bus has a portion which is between $T_{left}(i)$ and $T_{right}(i)$ and overlaps with another data output time period, the scheduler circuit 110 is used to select an appropriate sub-storage page type to make the overlapped portion time be minimized so as to minimize the possible waiting time of the specific bus. That is to say, when the scheduler circuit 110 selects the sub-storage page type, the scheduler circuit 110 performs the above conditional judgment upon the start time point and end time point of read task of each of the other memory planes, calculates the difference between the start time point $T_{left}(i)$ of the read task on each i-th other memory plane and the time point $t_R(j)+t_{Dout}$, obtains a first minimized difference among the above calculated differences, calculates the difference between the end time point $T_{right}(i)$ of the read task on each i-th other memory plane and the time point $t_R(j)$, obtains a second minimized difference among the above calculated differences, and obtains the sub-storage page type corresponding to a resultant minimized difference among the first minimized difference and the second minimized difference. By doing so, this can make a portion time, in which a data output time period corresponding to the sub-storage page type collides with (or overlaps with) another data output time period of the other memory plane, be a shortest time period/interval, so that the waiting time of the specific bus can be minimized and the performance of data output of the specific bus can be maximized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller, to be coupled to at least one flash memory through a specific bus, the at least one flash memory including multiple memory planes, each memory plane including multiple storage blocks, each storage block including multiple storage pages, and the flash memory controller comprises:

a controller circuit, for receiving a multi-plane read command signal sent by a host device to respectively read multiple data from multiple storage pages, corresponding to an address information, on the multiple memory planes within the at least one flash memory according to the address information recorded in the multi-plane read command signal, the controller circuit including multiple pending lists respectively corresponding to the multiple memory planes; and a scheduler circuit, coupled to the controller circuit, for reordering data stored in the multiple pending lists;

wherein the controller circuit converts the multi-plane read command signal into multiple read command signals corresponding to the multiple memory planes; the multiple read command signals comprise multiple first read commands and multiple second read commands, the multiple first read commands being used for reading multiple sub-storage pages of a storage page on a first memory plane, the multiple second read commands being used for reading multiple sub-storage pages of a storage page on a second memory plane; the controller circuit is used to temporarily store the multiple first read commands in a first pending list and store the multiple second read commands in a second pending list, and the scheduler circuit is used to reorder the multiple first read commands temporarily stored in the first pending list and reorder the multiple second read commands temporarily stored in the second pending list, to make multiple first data output time periods respectively corresponding to the multiple first read commands in the first pending list be staggered from and not overlap with multiple second data output times respectively corresponding to the multiple second read commands in the second pending list.

2. The flash memory controller of claim 1, wherein the multiple first read commands correspond to multiple read times having different lengths, and the multiple first data output time periods and the multiple second data output time periods are multiple data output time periods from the at least one flash memory to the flash memory controller through the specific bus.

3. The flash memory controller of claim 1, wherein the controller circuit comprises:

a front-end circuit, for receiving the multi-plane read command signal sent by the host device;

a flash translation layer (FTL) circuit, coupled to the front-end circuit, for converting the multi-plane read command signal into multiple read command signals corresponding to the multiple memory planes; and a back-end circuit, coupled to the FTL circuit, for temporarily storing the multiple first read commands in the first pending list, temporarily storing the multiple second read commands in the second pending list, and performing a sequential read operation upon the first memory plane and the second memory plane respectively according to reordered information in the first pending list and reordered information in the second pending list.

4. The flash memory controller of claim 1, wherein the scheduler circuit is used to reorder the multiple first read commands temporarily stored in the first pending list and reorder the multiple second read commands temporarily stored in the second pending list to minimize a waiting time of the specific bus.

5. The flash memory controller of claim 1, wherein the multiple first read commands are used to read data of multiple sub-storage pages of a storage page corresponding to the specific address on the first memory plane, and the multiple second read commands are used to read data of multiple sub-storage pages of another storage page corresponding to the specific address on the second memory plane.

6. The flash memory controller of claim 1, wherein, when performing a reordering operation, the scheduler circuit is used to calculate multiple expected start time points and multiple expected end time points of the multiple first data output time periods and calculate multiple expected start time points and multiple expected end time points of the multiple second data output time periods, to minimize a waiting time of the specific bus and to reorder information buffered in the first pending list and the second pending list.

7. The flash memory controller of claim 1, wherein when the controller circuit decides to issue a specific read command corresponding to an idle memory plane, the scheduler circuit is used to determine a type of a sub-storage page of a storage page to be read by the specific read command, to make a specific data output time period corresponding to the specific read command be staggered from the multiple first data output time periods and the multiple first data output time periods.

8. The flash memory controller of claim 7, wherein the type of sub-storage page indicates a j-th sub-storage page, and a read time corresponding to the j-th sub-storage page is $t_R(j)$; a start time point of a read task on an i-th memory plane is $T_{left}(i)=T_{start}(i)-T_{cur}$, and an end time point of the read task is $T_{right}(i)=T_{end}(i)-T_{cur}$, wherein Tour is a current time point, $T_{start}(i)$ is an expected start time point of the read task, $T_{end}(i)=T_{start}(i)+t_{Dout}$ is an expected end time point of the read task, and $t_{Dout}$ is a length of a corresponding data output time period; and, the scheduler circuit is used to determine the type of the sub-storage page so as to make $t_R(j)$ satisfy at least one of two inequality conditions as follows:

$$t_R(j)+t_{Dout}<T_{left}(i); \text{ or}$$

$$t_R(j)>T_{right}(i).$$

9. The flash memory controller of claim 1, wherein when the controller circuit decides to issue a specific read command corresponding to an idle memory plane, the scheduler circuit is used to determine a type of a sub-storage page to be read by the specific read command so as to minimize a waiting time of the specific bus.

10. The flash memory controller of claim 9, wherein the type of the sub-storage page indicates a j-th sub-storage page, and a read time corresponding to the j-th sub-storage page is $t_R(j)$; a start time point of a read task on an i-th memory plane is $T_{left}(i)=T_{start}(i)-T_{cur}$, an end time point of the read task is $T_{right}(i)=T_{end}(i)-T_{cur}$, wherein Tour is a current time point, $T_{start}(i)$ is an expected start time point of the read task, $T_{end}(i)=T_{start}(i)+t_{Dout}$ is an expected end time point of the read task, $t_{Dout}$ is a length of a corresponding data output time period; and, the scheduler circuit is used to determine the type of the sub-storage page based on a following condition:

$$\text{Min}(\text{Min}(|t_R(j)+t_{Dout}-T_{left}(i)|),\text{Min}(|t_R(j)-T_{right}(i)|)).$$

11. A data reading method of a flash memory controller, the flash memory controller to be coupled to at least one flash memory through a specific bus, the at least one flash memory including multiple memory planes, each memory plane including multiple storage blocks, each storage block including multiple storage pages, and the data reading method comprises:

using a controller circuit to receive a multi-plane read command signal sent by a host device to respectively read multiple data from multiple storage pages, corresponding to an address information, on the multiple memory planes within the at least one flash memory according to an address information recorded in the multi-plane read command signal, the controller circuit including multiple pending lists respectively corresponding to the multiple memory planes;

converting the multi-plane read command signal into multiple read command signals corresponding to the multiple memory planes, the multiple read command signals comprising multiple first read commands and multiple second read commands, the multiple first read commands being used for reading multiple sub-storage pages of a storage page on a first memory plane, the multiple second read commands being used for reading multiple sub-storage pages of a storage page on a second memory plane;

temporarily storing the multiple first read commands in a first pending list and storing the multiple second read commands in a second pending list; and reordering the multiple first read commands temporarily stored in the first pending list and reordering the multiple second read commands temporarily stored in the second pending list, to make multiple first data output time periods respectively corresponding to the multiple first read commands in the first pending list be staggered from and not overlap with multiple second data output times respectively corresponding to the multiple second read commands in the second pending list.

12. The data reading method of claim 11, wherein the multiple first read commands correspond to multiple read times having different lengths, and the multiple first data output time periods and the multiple second data output time periods are multiple data output time periods from the at least one flash memory to the flash memory controller through the specific bus.

13. The data reading method of claim 11, further comprising:

using a front-end circuit to receive the multi-plane read command signal sent by the host device;

converting the multi-plane read command signal into multiple read command signals corresponding to the multiple memory planes; and temporarily storing the multiple first read commands in the first pending list, temporarily storing the multiple second read commands in the second pending list, and performing a sequential read operation upon the first memory plane and the second memory plane respectively according to reordered information in the first pending list and reordered information in the second pending list.

14. The data reading method of claim 11, further comprising:

reordering the multiple first read commands temporarily stored in the first pending list and reordering the multiple second read commands temporarily stored in the second pending list to minimize a waiting time of the specific bus.

15. The data reading method of claim 11, wherein the multiple first read commands are used to read data of multiple sub-storage pages of a storage page corresponding to the specific address on the first memory plane, and the multiple second read commands are used to read data of multiple sub-storage pages of another storage page corresponding to the specific address on the second memory plane.

16. The data reading method of claim 11, further comprising:

when performing a reordering operation, calculating multiple expected start time points and multiple expected end time points of the multiple first data output time periods and calculating multiple expected start time points and multiple expected end time points of the multiple second data output time periods, to minimize a waiting time of the specific bus and to reorder information buffered in the first pending list and the second pending list.

17. The data reading method of claim 11, further comprising:

when deciding to issue a specific read command corresponding to an idle memory plane, determining a type of a sub-storage page of a storage page to be read by the specific read command, to make a specific data output time period corresponding to the specific read command be staggered from the multiple first data output time periods and the multiple first data output time periods.

18. The data reading method of claim 17, wherein the type of sub-storage page indicates a j-th sub-storage page, and a read time corresponding to the j-th sub-storage page is $t_R(j)$; a start time point of a read task on an i-th memory plane is $T_{left}(i)=T_{start}(i)-T_{cur}$, and an end time point of the read task is $T_{right}(i)=T_{end}(i)-T_{cur}$, wherein $T_{cur}$ is a current time point, $T_{start}(i)$ is an expected start time point of the read task, $T_{end}(i)=T_{start}(i)+t_{Dout}$ is an expected end time point of the read task, and $t_{Dout}$ is a length of a corresponding data output time period; and, the scheduler circuit is used to determine the type of the sub-storage page so as to make $t_R(j)$ satisfy at least one of two inequality conditions as follows:

$$t_R(j)+t_{Dout}<T_{left}(i); \text{ or}$$

$$t_R(j)>T_{right}(i).$$

19. The data reading method of claim 11, further comprising:

when deciding to issue a specific read command corresponding to an idle memory plane, determining a type of a sub-storage page to be read by the specific read command so as to minimize a waiting time of the specific bus.

20. The data reading method of claim 19, wherein the type of the sub-storage page indicates a j-th sub-storage page, and a read time corresponding to the j-th sub-storage page is $t_R(j)$; a start time point of a read task on an i-th memory plane is $T_{left}(i)=T_{start}(i)-T_{cur}$, an end time point of the read task is $T_{right}(i)=T_{end}(i)-T_{cur}$, wherein Tour is a current time point, $T_{start}(i)$ is an expected start time point of the read task, $T_{end}(i)=T_{start}(i)+t_{Dout}$ is an expected end time point of the read task, $t_{Dout}$ is a length of a corresponding data output time period; and, the scheduler circuit is used to determine the type of the sub-storage page based on a following condition:

$$\text{Min}(\text{Min}(|t_R(j)+t_{Dout}-T_{left}(i)|),\text{Min}(|t_R(j)-T_{right}(i)|)).$$

* * * * *